UNITED STATES PATENT OFFICE.

JAMES P. GAY, OF CINCINNATI, OHIO.

IMPROVED COMPOSITION FOR BLACK VARNISH.

Specification forming part of Letters Patent No. 38,737, dated June 2, 1863.

*To all whom it may concern:*

Be it known that I, JAMES P. GAY, of Cincinnati, in the county of Hamilton and State of Ohio, have invented a new and Improved Black Varnish; and I do hereby declare the following to be a full, clear, and exact description of the ingredients and mode of compounding the same.

The principal substance, or that which constitutes the basis of my improved black paint or varnish, is candle-pitch. This substance is produced in considerable quantities in the process of preparing stearine for the manufacture of candles. It is an intensely black, brittle, and lustrous body, fusible by heat, but not acted upon by air or water. It combines readily with the substances hereinafter specified when treated in the manner explained, and is by admixture with them reduced to a convenient fluid consistency susceptible of being applied to surfaces with an ordinary paint-brush like any other paint or varnish, and when thus applied to surfaces of either wood or metal it forms a highly lustrous and enduring coating.

I will now describe my mode of preparing the candle-pitch or of combining it for the purpose of producing my improved black varnish.

Take one hundred pounds hard candle-pitch and heat it to the temperature of 375° or 400°. While at this heat add ten pounds litharge, which is to be done by sifting it into the melted pitch slowly and stirring it thoroughly during the process, after which add two pounds of powdered quicklime, stirring it in thoroughly, as before. Let the compound stand until partially cooled, and then add twenty gallons of benzine or coal-naphtha and mix so as to incorporate the whole together thoroughly, when the varnish is ready for use.

The substance which I designate "candle-pitch" is but little known in the arts beyond the department in which it is produced. It has been applied to but few useful purposes; but its peculiar properties of endurance and of preserving wood and metal surfaces from the action of air and water—salt-water as well as fresh—render it a valuable and an appropriate substance for the purpose herein named. When applied to metal surfaces—such as iron fences and ornamental work—it affords an elegant and enduring luster.

Having fully explained my improved black varnish, what I claim as my invention, and desire to secure by Letters Patent, is the following:

The composition for black varnish consisting of the materials herein specified, combined in the proportions and substantially in the manner herein described.

JAMES P. GAY.

Witnesses:
 D. L. REED,
 FRANCIS SCOTT.